United States Patent [19]

Karaki et al.

[11] Patent Number: 5,130,965
[45] Date of Patent: Jul. 14, 1992

[54] OPTICAL RECORDING/REPRODUCING APPARATUS USING A LIGHT SPOT SWITCHING MEANS FOR CENTERING BEAMS ON AN INFORMATION TRACK

[75] Inventors: Morihiro Karaki; Yasuyuki Satou; Masahisa Shinoda, all of Tokyo, Japan

[73] Assignee: Mitsubishi Denki Kabushiki Kaisha, Japan

[21] Appl. No.: 544,995

[22] Filed: Jun. 27, 1990

[30] Foreign Application Priority Data

Jun. 27, 1989 [JP] Japan .................................. 1-162662

[51] Int. Cl.$^5$ .............................................. G11B 7/00
[52] U.S. Cl. ........................... 369/44.38; 369/109; 369/122; 369/112; 369/44.11; 369/44.13; 369/44.37
[58] Field of Search ............... 369/44.23, 44.38, 44.37, 369/44.26, 44.31, 116, 112, 109, 44.12, 44.11, 44.13, 122

[56] References Cited

U.S. PATENT DOCUMENTS

| 4,462,095 | 7/1984 | Chen ................................. | 369/44.38 |
| 4,730,899 | 4/1988 | Kime et al. ........................ | 369/112 |
| 4,754,446 | 6/1988 | Reno ................................. | 369/111 |
| 4,970,380 | 11/1990 | Miller ............................... | 369/116 |

Primary Examiner—Roy N. Envall, Jr.
Assistant Examiner—Nabil Hindi
Attorney, Agent, or Firm—Wolf, Greenfield & Sacks

[57] ABSTRACT

An optical recording/reproducing apparatus capable of detecting recording defects on an information recording medium comprises a beam irradiation device for irradiating a first beam, by which information pits are recorded on/reproduced from the information track on the information recording medium, a second beam preceding the first beam and a third beam following the first beam, along the information track; an optical detector having a plurality of light receiving surfaces for individually detecting the reflected light of the first beam, the second beam and the third beam, which have been reflected from the information recording medium; a monitoring device for, in a recording mode, monitoring the condition of the information track prior to and after recording in response to amount-of-light signals which respectively correspond to the reflected light of the second beam and the third beam; and a signal generator for, in a reproducing mode, producing a tracking error signal in response to the amount-of-light signals. The optical recording/reproducing apparatus is characterized in that the beam irradiation device includes a light spot switching device for changing the light spot locations of the second beam and the third beam on the information recording medium, depending upon the recording mode or the reproducing mode.

4 Claims, 7 Drawing Sheets

OPTICAL RECORDING/REPRODUCING APPARATUS USING A LIGHT SPOT SWITCHING MEANS FOR CENTERING BEAMS ON AN INFORMATION TRACK

TECHNICAL FIELD

The present invention relates to an optical recording and reproducing apparatus adapted to detect defects and the like at the time of recording by detecting tracking error signals and monitoring the status of information tracks prior to and after recording information, and more particularly to an optical recording and reproducing apparatus which is highly reliable and economical.

DESCRIPTION OF PRIOR ART

An optical recording and reproducing apparatus of the type in which an optical means such as a laser beam is used to record or reproduce information on or from a rotatable disc information recording medium in the form of a concentric circle or spiral has hither to been well known. An apparatus of this type enables a high density recording to be attained in contrast to the corresponding apparatuses of a magnetic disc type. On the other hand, however, since many more defects occur in the optical information recording medium than in the magnetic discs, a method is required whereby reliability may be secured in information which has been recorded on the optical information recording medium.

It is conceivable in order to avoid this problem to rotate the information recording medium on which information is recorded one turn and to detect the reproducing signals to decide whether or not there are any defects in the recording. The problem associated with this method is the time required for rotating the recording medium one turn. In recent years, optical recording and reproducing apparatuses adapted to detect reproduction signals on a real time basis have been under development.

Figure 1:
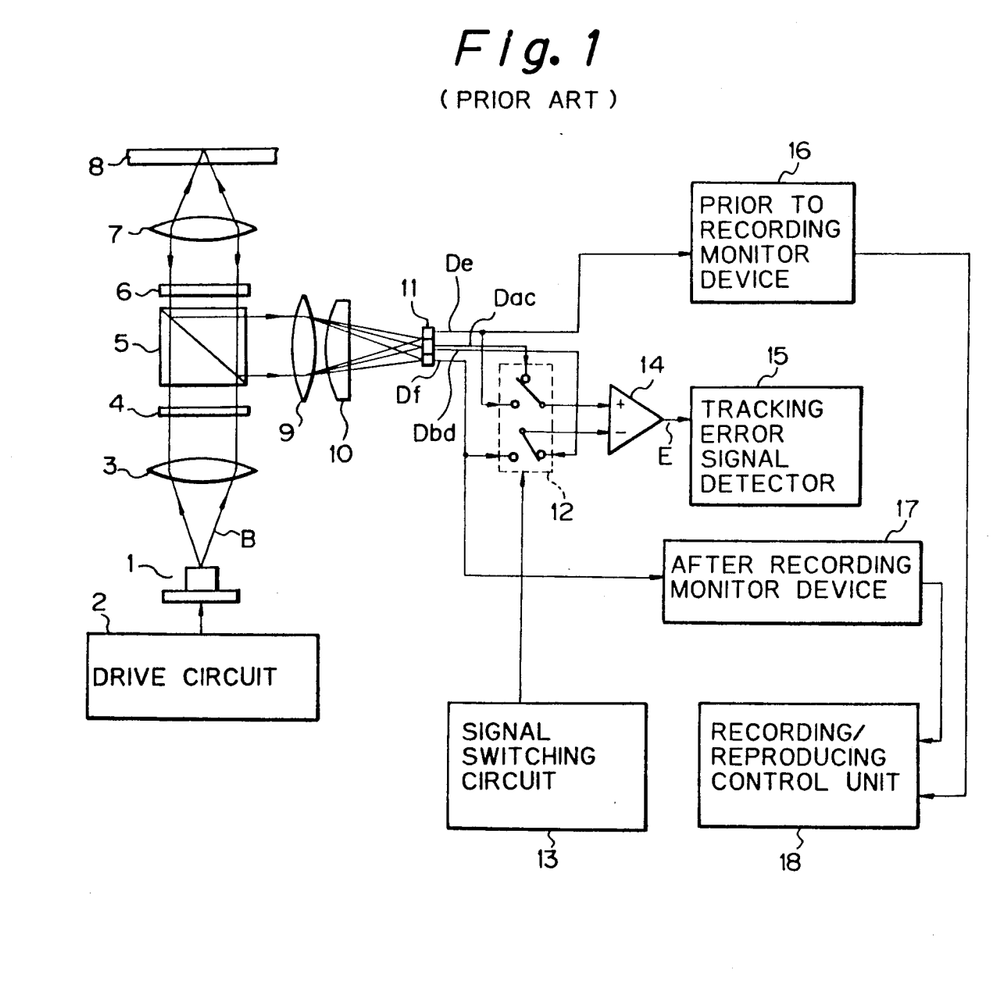
FIG. 1 is a block diagram illustrating an optical recording and reproducing apparatus according to a prior art.
Figure 2:
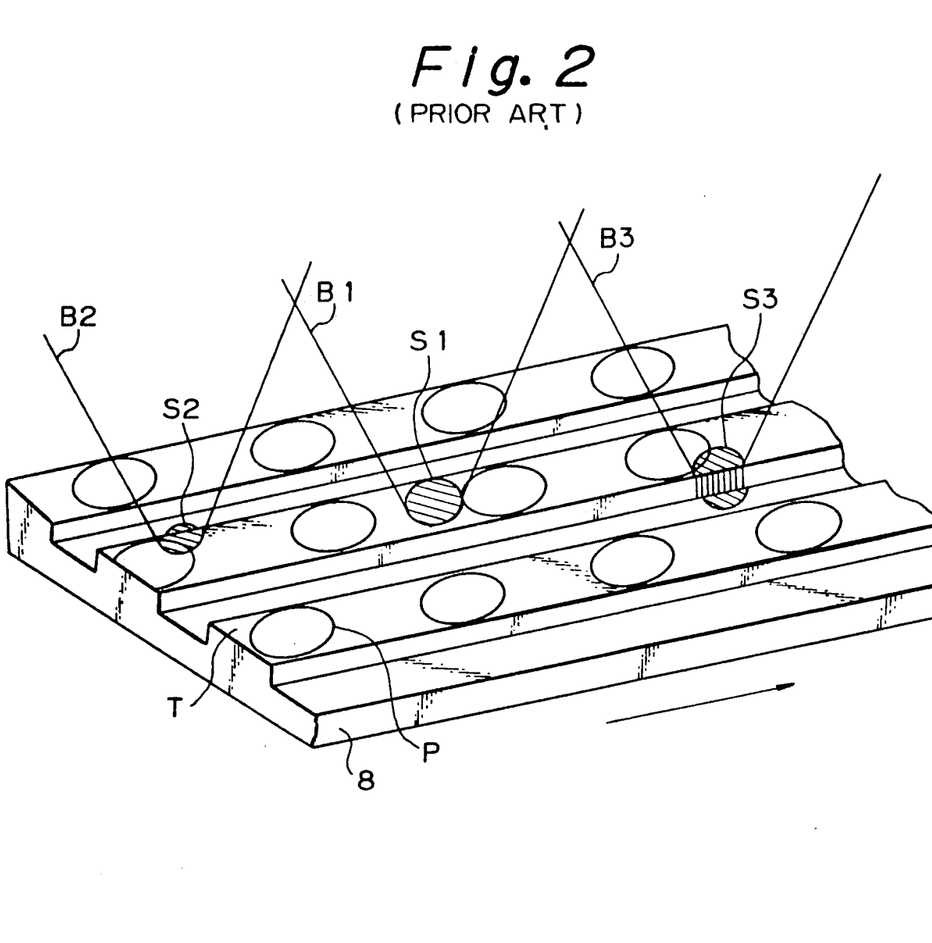
FIG. 2 is a enlarged perspective view showing the recording surface of the information recording medium shown in FIG. 1.
Figure 3:
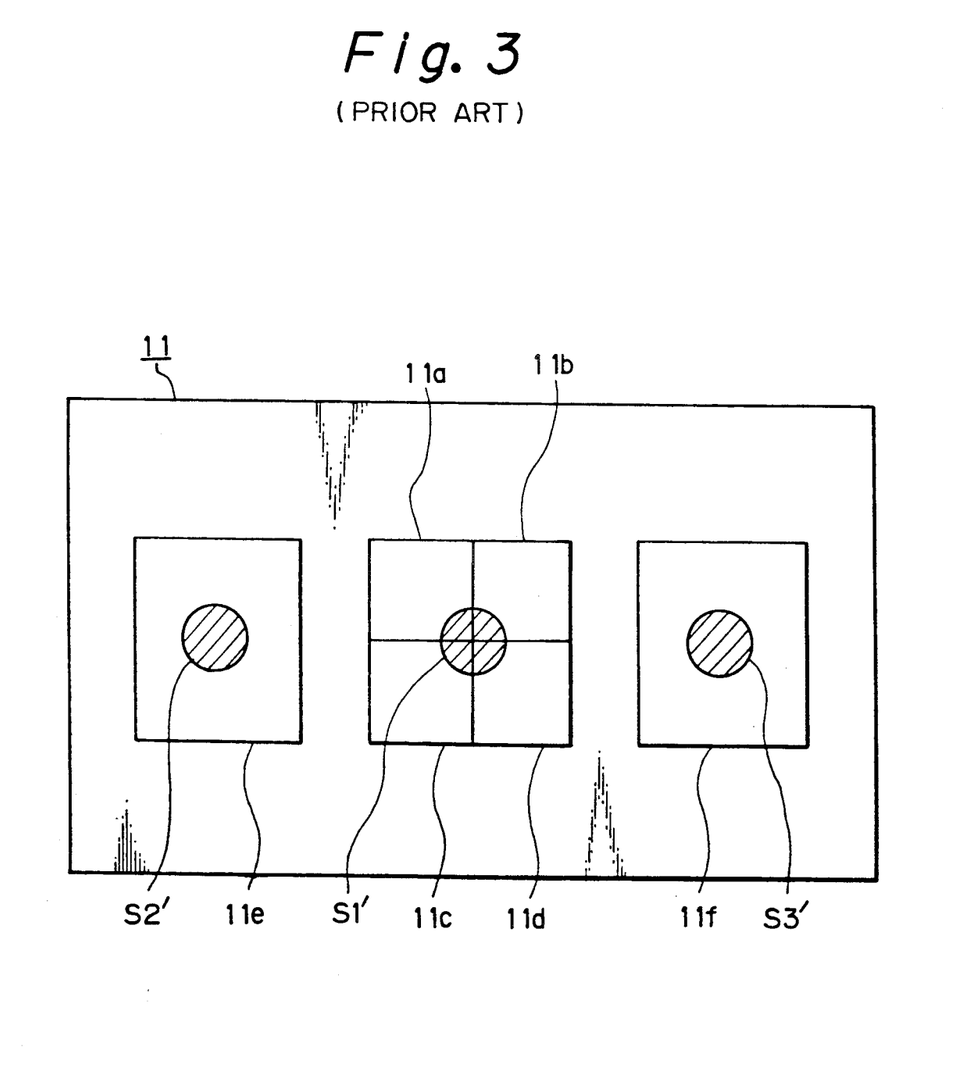
FIG. 3 is a plane view showing the light receiving surface of the optical detector shown in FIG. 1.

FIG. 1 is a block diagram illustrating an optical recording and reproducing apparatus according to a prior art as disclosed in the Japanese Patent Laid-Open Publication No. 61-206925. FIG. 2 is an enlarged perspective view illustrating the recording surface of the information recording medium as shown in FIG. 1. FIG. 3 is an enlarged plane view illustrating the light receiving surface of the optical detector as shown in FIG. 1.

In FIG. 1, numeral 1 designates a semiconductor laser source adapted to emit the laser beam B, numeral 2 a drive circuit adapted to drive the semiconductor laser source 1, and numeral 3 a collimator lens disposed at the beam emitting side of the semiconductor laser source 1. Numeral 4 designates a diffraction grid adapted to divide the parallel beam flux from the collimator lens 3 into a primary beam (a first beam) and ± first order diffraction beams (a second beam and a third beam), numeral 5 a deflection beam splitter disposed to receive the first through third beams which have passed through the diffraction grid 4, numeral 6 a quarter wavelength plate, numeral 7 an object lens, and numeral 8 an information recording medium (an optical disc) disposed in proximity to the object lens 7. The quarter wavelength plate 6 and the object lens 7 are interposed between the deflection beam splitter 5 and the information recording medium 8.

In the above-described arrangement, although the diffraction grid 4 has been disposed between the collimator lens 3 and the deflection beam splitter 5, it may be disposed between the semiconductor laser source 1 and the collimator lens 3.

The information recording medium 8 is provided with the information tracks T thereon in the rotational direction of the disc (see an arrow) as shown in FIG. 2. The first beam B1—the third beam B3 are irradiated onto the information tracks T. It is to be noted in particular that the central first beam B1 irradiates a light spot S1 which then causes the corresponding pit P to be recorded or reproduced. Accordingly, the light spot S1 by the first beam B1 is always located at the center of the information track T. On the other hand, since both the second beam B2 which precedes the first beam B1 and the third beam B3 which follows the first beam serve as the sub-beams for generating tracking error signals at the time of reproduction, they are caused to irradiate light spots S2 and S3 at locations displaced from the center of the information track T. At the time of recording, since the light intensity of the first beam B1 is strong and the second beam B2 and the third beam B3 are to serve only for monitoring the status of the information track T, their light intensity is set at a lower level.

In FIG. 1, numerals 9 and 10 designate a group of lenses for a sensor system adapted to condense the parallel beam flux of the respective beams B1 through B3 reflected by the deflection beam splitter 5. For example, the numeral 9 is a convex lens and the numeral 10 is a cylindrical lens.

Numeral 11 designates an optical detector adapted to receive the beam which has passed through the group of lenses 9 and 10. The optical detector has the beam receiving surface which is split into six beam receiving surfaces 11a through 11f as shown in FIG. 3. Of these beam receiving surfaces, the central beam receiving surfaces 11a through 11d are irradiated with light spot S1' caused by the reflected light of the first beam B1, while the beam receiving surfaces 11e and 11f at the opposite sides are irradiated with the light spots S2' and S3' caused by the reflected light of the second beam B2 and the third beam B3. The respective beam receiving surfaces 11a through 11f permit the first beam B1 through the third beam B3 to be detected individually.

In FIG. 1, the symbol Dac designates an amount-of-light signal representative of the sum of the amount-of-light signals Da and Dc respectively from the beam receiving surfaces 11a and 11c, the symbol Dbd designates an amount-of-light signal representative of the sum of amount-of-light signals Db and Dd respectively from the beam receiving surfaces 11b and 11d, the symbol De designates an amount-of-light signal from the beam receiving surface 11e, which is representative of the reflected light of the second beam, and the symbol Df designates an amount-of-light signal from the beam receiving surface 11f, which is representative of the reflected light of the third beam B3.

Numeral 12 designates an interlocking switch adapted to simultaneously switch and select the amount-of-light signals Dac and Dbd, and De and Df, numeral 13 a signal switching circuit adapted to operate the interlocking switch 12 and change over the detection system for the tracking error signal E, numeral 14 a differential amplifier adapted to output the tracking error signal E in accordance with the difference between two amount-of-light signals which have been selected by the interlocking switch 12, numeral 15 a tracking error signal detector adapted to detect the tracking error signal E from the differential amplifier 14, numeral 16 a prior to recording monitor device adapted to detect the condition of the information track T before recording in accordance with the amount-of-light signal De, numeral 17 an after recording monitor device adapted to monitor the condition of the information track T after receiving in accordance with the amount-of-light signal Df, and numeral 18 a recording and reproduction control unit adapted to detect information such as the recording condition, sector number, etc. in accordance with the outputs from the prior to recording monitor device 16 and the after recording monitor device 17.

It should be noted that the components 1 to 7 constitute the beam irradiation apparatus adapted to irradiate the first beam B1 through the third beam B3 for irradiating the information tracks T on the information recording medium 8.

Operation of the optical recording and reproducing apparatus according to a prior art will next be explained by referring to FIG. 1 through FIG. 3.

Firstly, explanation is made with regard to a case involving reproducing information already recorded on the information recording medium 8. The beam B comprising a divergent beam emitted from the semiconductor laser source 1 is converted into a parallel beam flux by means of the collimator lens 3, which is then passed through the diffraction grid 4 and is divided into the first beam B1 emitted in the same direction as the incident parallel beam flux and ± first order second and third beams B2 and B3 which are deflected somewhat relative to the incident parallel beam flux and are emitted. Subsequently, the beams are irradiated on the information recording medium 8 through the deflection beam splitter 5, a quarter wavelength plate 6 and the object lens 7, and thus form the light spots S1-S3 by the respective beam B1 through B3 on the information track T.

At this time, the light intensity of the respective beams B1-B3 is not modulated and provides a constant output. The ratio of the light intensity of the first beam B1 to the second and third beams B2 and B3 can be optionally set depending on the design of the diffraction grid 4. The light spot S1 of the first beam B1 is formed on the central portion of the information track T, while the light spots S2 and S3 by the second beam B2 and the third beam b3 which serve as sub-beams for detecting the tracking error signals are formed on the locations displaced from the center of the information track T.

Then the respective beams B1-B3 reflected from the information recording medium 8 are again passed through the object lens 7 and the quarter wavelength plate 6 to arrive at the deflection beam splitter 5. Thus, since the deflection direction of the beams is turned by 90 degrees as a result of passing through the quarter wavelength plate 6 in a forward and reverse direction, they are reflected by the deflection beam splitter 5. The reflected beams B1-B3 are then condensed on the optical detector 11 through the group of sensor lenses 9, 10 and then form the light spots S1'-S3' as shown in FIG. 3.

At this time, since the light spot S1' formed by the first beam B1 contains the recording information of the pit P on the information track T, it can provide a reproduction signal by summing the amount-of-light signals Da-Dd on the light receiving surfaces 11a-11d irradiated by the light spot S1'. Since the detection system for producing reproduction signals is well known, it is not illustrated herein.

It is also to be noted that the respective amount-of-light signals Da-Df which have been detected at the six light receiving surfaces 11a-11f of the optical detector 11 are used for operation in accordance with the well known method of signal detecting, whereby the focusing error signals based on the astigmatism method and the tracking error signals based on the three-beam method can be generated. Although it is not described in particular here, the three-beam method is utilized in general as the tracking error signal detecting method in optical discs and the like which are exclusively used for reproduction such as CD (compact disc) player. It is also known in general that the three-beam method is a simple yet effective method.

Accordingly at the time of reproduction, the interlocking switch 12 is switched over from the condition shown in FIG. 1 by means of the signal switching circuit 13 so as to select the amount-of-light signals De and Df from the light receiving surfaces 11e and 11f respectively. At this time, the tracking error signals E output from the differential amplifier 14 will be:

$$E = De - Df$$

to be the difference between the respective amount-of-light signals De and Df. This tracking error signal E is input to the tracking error signal detector 15 so as to decide whether the reproduced information is proper or not. It is further to be noted that the amount-of-light signals De and Df are input to the prior to recording monitor device 16 as well as the after recording monitor device respectively, but no monitoring operation is executed at the time of reproduction.

On the other hand, in the case of recording information on the information recording medium 8, the drive circuit 2 operates the semiconductor laser source 1 in a pulse drive manner in accordance with the recording information, so that the beam B containing the recording information (such as that information corresponding to the pulse width) can be irradiated. The beam B is then split into the first beam B1—the third beam B3 to be irradiated on the information track T as the light spots S1-S3.

In this case, the first beam B1 for recording has a strong light intensity, while the second beam B2 and the third beam B3 have a lower light intensity than the first beam B1, thus having no effect on recording.

The light spot S1 forms in succession the pit P having a shape corresponding to the recording information on the information track T and at the same time is reflected therefrom. The light spot S2 preceding the light spot S1 is reflected from the information track T before recording and the light spot S3 following the light spot S1 is reflected from the pit P after recording.

In a similar manner as above, the reflected light of the respective beams B1-B3 are irradiated on the optical detector 11 as the light spots S1'-S3'. A push-pull method is employed in the process of generating the tracking error signals E at the time of recording unlike at the time of reproduction.

The push-pull method is defined as a method of detecting the deviation of the information track T in accordance with the far field pattern (or the light pattern having an expanded field) by superimposing the reflected light of the first beam B1 which has been diffracted due to the grooves engraved along the information track T, and the reflected light of the first beam B1 which has been directly reflected from the information track T. In accordance with this method, the interlocking switch 12 selects the amount-of-light signals Dac and Dbd under the condition shown in FIG. 1, and the tracking error signal E will be as follows:

$$E = (Da + Dc) - (Db + Dd) = Dac - Dbd$$

At this time, the second beam B2 and the third beam B3 are not utilized for detecting the tracking error signals E but input to the prior to recording monitor device 16 and the after recording monitor device 17, so that they are used for detecting the condition of the information track T prior to recording and after recording. More specifically, the reflected light of the second beam B2 is utilized to decide whether or not there are any defects in the information track T prior to recording and the reflected light of the third beam B3 is utilized to decide whether or not the pit P has been properly recorded on the information track T.

The monitoring signals which have been thus provided by the prior to recording monitor device 16 and the after recording monitor device 17 are input to the recording and reproduction control unit 18. When the recording and reproduction control unit 18 has decided that there are defects on the information track, then the recording procedure can be repeated so as to improve recording error rates for the information recording medium 8. However, it is to be noted that in this case, the irradiation positions of the respective light spots S2 and S3 on the information recording medium 8 are displaced from the center of the information track T similarly to the case of reproduction, so that the reflected lights of the second beam B2 and the third beam B3 are not sufficiently strong.

Since according to the conventional optical recording and reproduction apparatus, the tracking error signals are detected at the time of reproduction according to the three-beam method, and the irradiation positions of the light spots of the second beam B2 and the third beam B3 which are the ± first order components are displaced from the center of the information track T relative to the information recording medium 8, there has been such a problem as the reflected light of the second beam B2 and the third beam B3 required for monitoring the conditions prior to recording and after recording at the time of recording could not be sufficiently determined and reliability of monitoring was therefore degraded. Preparing another beam for monitoring the conditions at the time of monitoring is also economically disadvantageous.

SUMMARY OF THE INVENTION

The present invention has been provided to solve the problems as described above. An object of the present invention is therefore to provide an optical recording and reproducing apparatus capable of providing economical and reliable detection of the defects in recording by improving the quality of the prior to recording and after recording monitoring signals without newly providing a complicated optical system.

Another object of the present invention is to provide an optical recording and reproducing apparatus provided with a light spot switching means adapted to switch the locations of the respective light spots of the second beam and third beam on the information track depending on a recording mode or a reproduction mode.

According to the present invention, the positions of irradiation of the light spots by the second beam and the third beam are displaced from the center of the information track so as to convert the beams into sub-beams for detecting the tracking error signals at the time of reproduction according to the three-beam method and are placed at the center of the information track so as to convert them into beams for monitoring the condition of the track prior to recording and after recording at the time of recording.

Further according to the present invention, there is provided an optical recording and reproducing apparatus which is capable of detecting tracking error signals at the time of reproduction and detecting monitoring signals at the time of recording without utilizing a complicated optical system and when is economical and highly reliable in detecting recording defects, since a light spot switching means adapted to optionally change the respective light spot positions of the second beam and the third beam on the information track is so provided that the irradiation positions of the respective light spots are displaced from the center of the information track at the time of reproduction and are located at the center of the information track at the time of recording.

EMBODIMENTS

Figure 4:
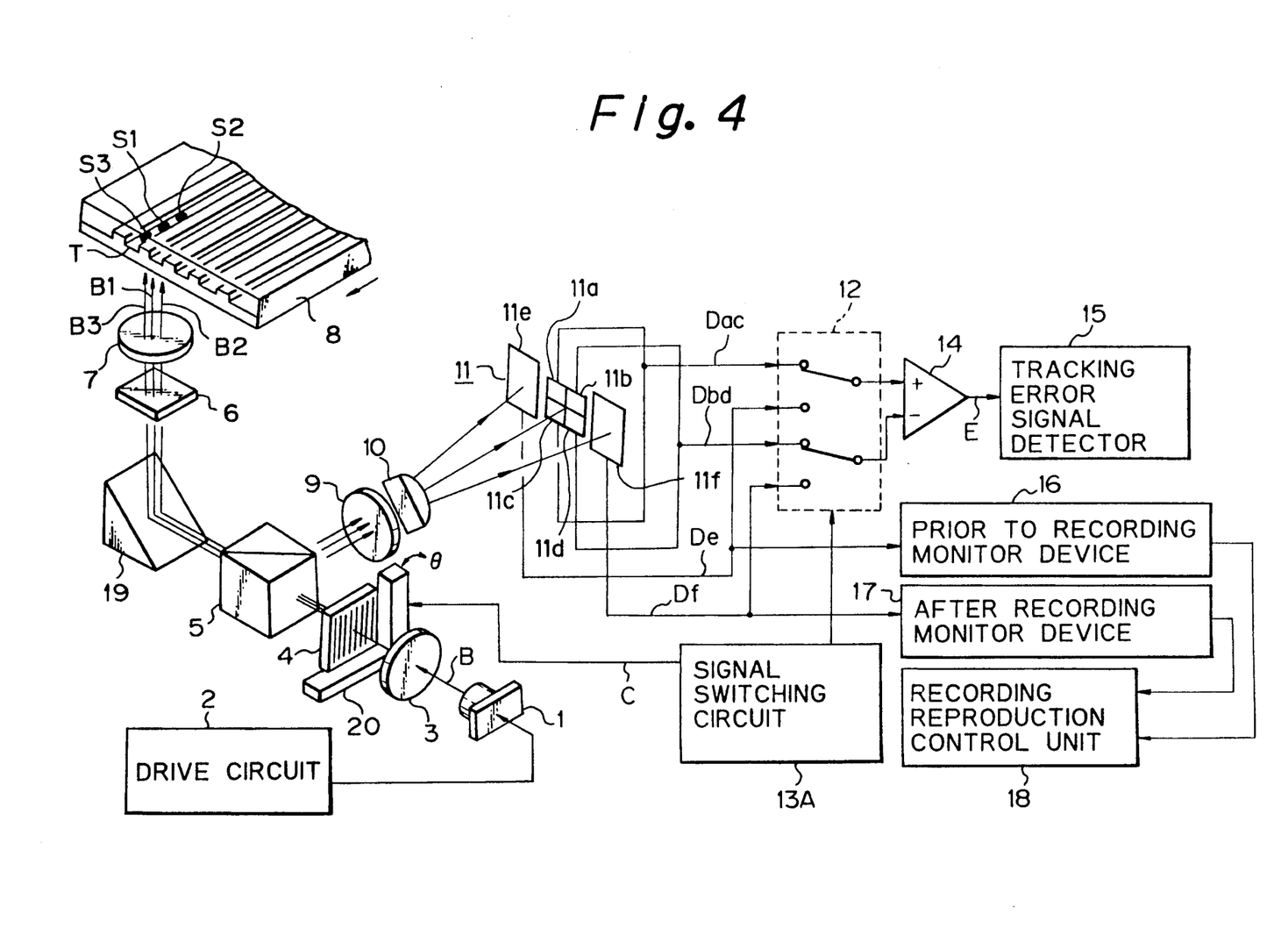
FIG. 4 is a block diagram showing an embodiment according to the present invention.

An embodiment of the present invention will now be explained by referring to the accompanying drawings. FIG. 4 is a block diagram illustrating an embodiment of the present invention wherein numerals 1-12 and 14-18 are same as those in FIG. 1.

Numeral 13A designates a signal switching circuit corresponding to numeral 13, wherein at the time of switching by the interconnecting switch 12, a switching signal C for changing the irradiation locations of the light spots S2 and S3 is output.

Numeral 19 designates a mirror interposed between the deflection beam splitter 5 and the quarter wavelength plate 6, the mirror being adapted to turn the optical path by 90 degrees so as to lead the respective beams B1-B3 toward the information recording medium 8.

Numeral 20 designates a tilting mechanism provided at the diffraction grid 4. The tilting mechanism is so constructed as to finely adjust the diffraction grid 4 in the direction designated by the arrow θ by means of a driving mechanism (not shown) in response to the switching signal C from the signal switching circuit 13A so that the direction of the respective beams B1-B3 can be changed, thereby constituting a light spot switching means adapted to change the positions of the respective light spots S2 and S3 of the second beam B2 and the third beam B3 on the information track T depending on a recording mode or a reproducing mode.

The mirror 19 and the tilting mechanism 20 along with the semiconductor laser source 1—the object lens 7 constitute the beam irradiation apparatus adapted to irradiate the first beam B1—the third beam B3 on the information track T on the information recording medium 8.

Figure 5:
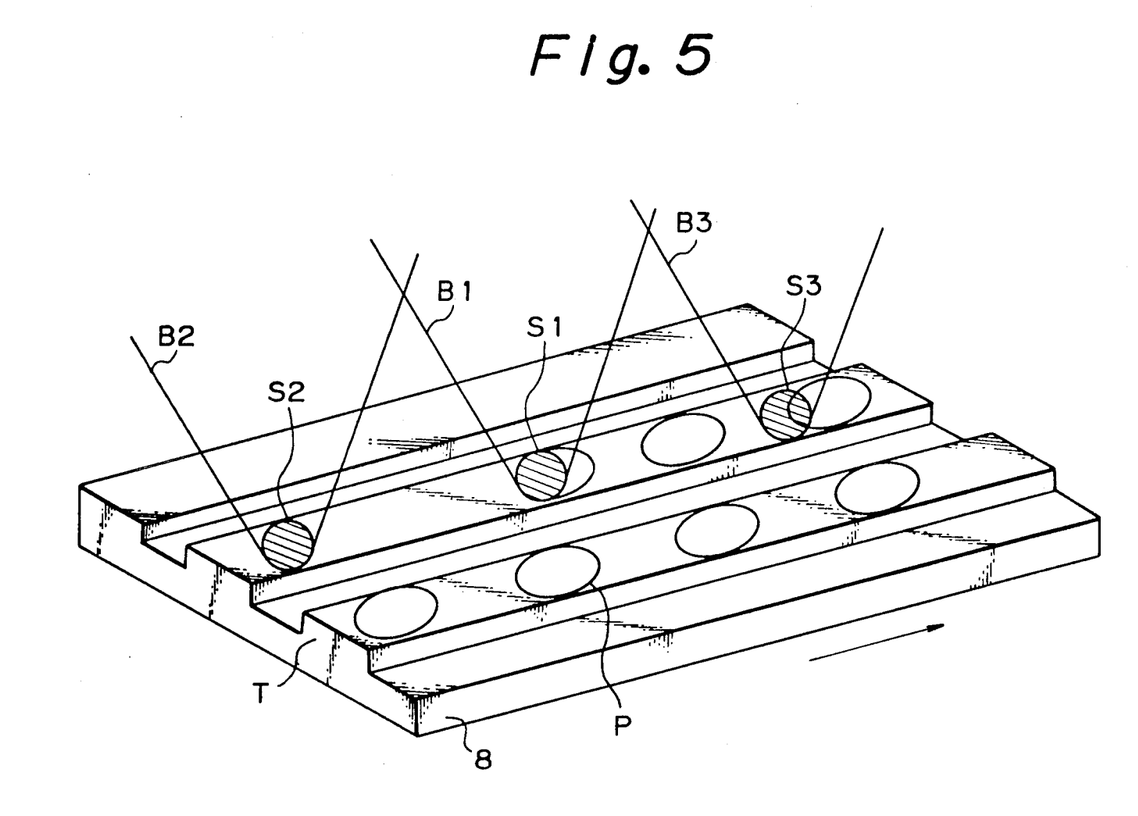
FIG. 5 is an enlarged perspective view showing the recording surface of the information recording medium shown in FIG. 4 so as to illustrate the irradiation positions of the light spots at the time of recording.

FIG. 5 is an enlarged perspective view of the recording surface of the information recording medium 8 for illustratively showing the irradiation locations of the light spots S1-S3 of the respective beams B1-B3 at the time of recording, wherein the light spot S2 of the second beam B2 and the light spot S3 of the third beam B3 are irradiated on the center of the information track T in the same manner as the light spot S1 of the first beam B1.

Operation of an embodiment of the present invention shown in FIG. 4 will next be explained by referring to FIGS. 2, 3 and 5.

It is to be understood that the irradiation locations of the respective light spots S1-S3 at the time of reproduction are as shown in FIG. 2, the locations of the light spots S1'-S3' irradiated on the light receiving surfaces 11a-11f of the optical detector 11 are as shown in FIG. 3, and operation of the detecting system for the reproducing signals and the detecting system for the tracking error signals is the same as for those already explained. It is also to be understood that since the recording operation for the normal information signals is the same as that of the prior art, no detailed explanation thereof will be given here.

At the time of reproduction, the signal switching circuit 13A changes the status of the interlocking switch 12 from the status shown in FIG. 4 so as to select the amount-of-light signals De and Df which are then output as the tracking error signal E, and controls the tilting mechanism 20 by use of the switching signal C, so that the respective light spots S2 and S3 of the second beam B2 and the third beam B3 can be irradiated at the locations displaced from the center of the information track T as shown in FIG. 2. In this way, the tracking error signal can be detected in accordance with the three-beam method in the same way as explained earlier.

At the time of recording, the signal switching circuit 13A changes the status of the interlocking switch 12 to the status as shown in FIG. 4 so as to select the amount-of-light signals Dac and Dbd which are then output as the tracking error signal E. At the same time, the signal switching circuit 13A controls the tilting mechanism 20 by use of the switching signal C to turn the diffraction grid 4 in the direction designated by the arrow θ, so that the light spots S2 and S3 can be irradiated at the center of the information track T as shown in FIG. 5. In this way, the reflected light of the second beam B2 and the third beam B3 which indicate the condition of the information track T prior to and after recording, can be sufficiently obtained and the amount of light of the light spots S2' and S3' irradiated on the respective light receiving surfaces 11e and 11f can be increased. Accordingly, SN ratio of the amount-of-light signals De and Df can be enhanced, and the quality of the monitoring signals from the prior to recording monitor device 16 and the after recording monitor device 17 can be improved, whereby reliability in respect of detection of defects by the recording and reproducing control unit 18 can be improved.

It is a matter of course that the switching signal C from the signal switching circuit 13A is predetermined in accordance with the parameters such as the pitches of the information track T on the information recording medium 8 and the value of such predetermined switching signal may be optionally altered depending on, for example, the type of information recording medium 8.

A tilting mechanism 20 for changing the angle of the diffraction grid 4 is employed in the above-described embodiment as a light spot switching means for switching the irradiation positions of the light spots S2 and S3 as shown in FIG. 2 through FIG. 5 and this tilting mechanism constitutes a frame rotatable in the direction shown by the arrow θ in FIG. 1. It is to be understood that any kind of tilting mechanism may be employed as shown in FIG. 6 if it is capable of tilting or rotating the diffraction grid 4.

Figure 6:
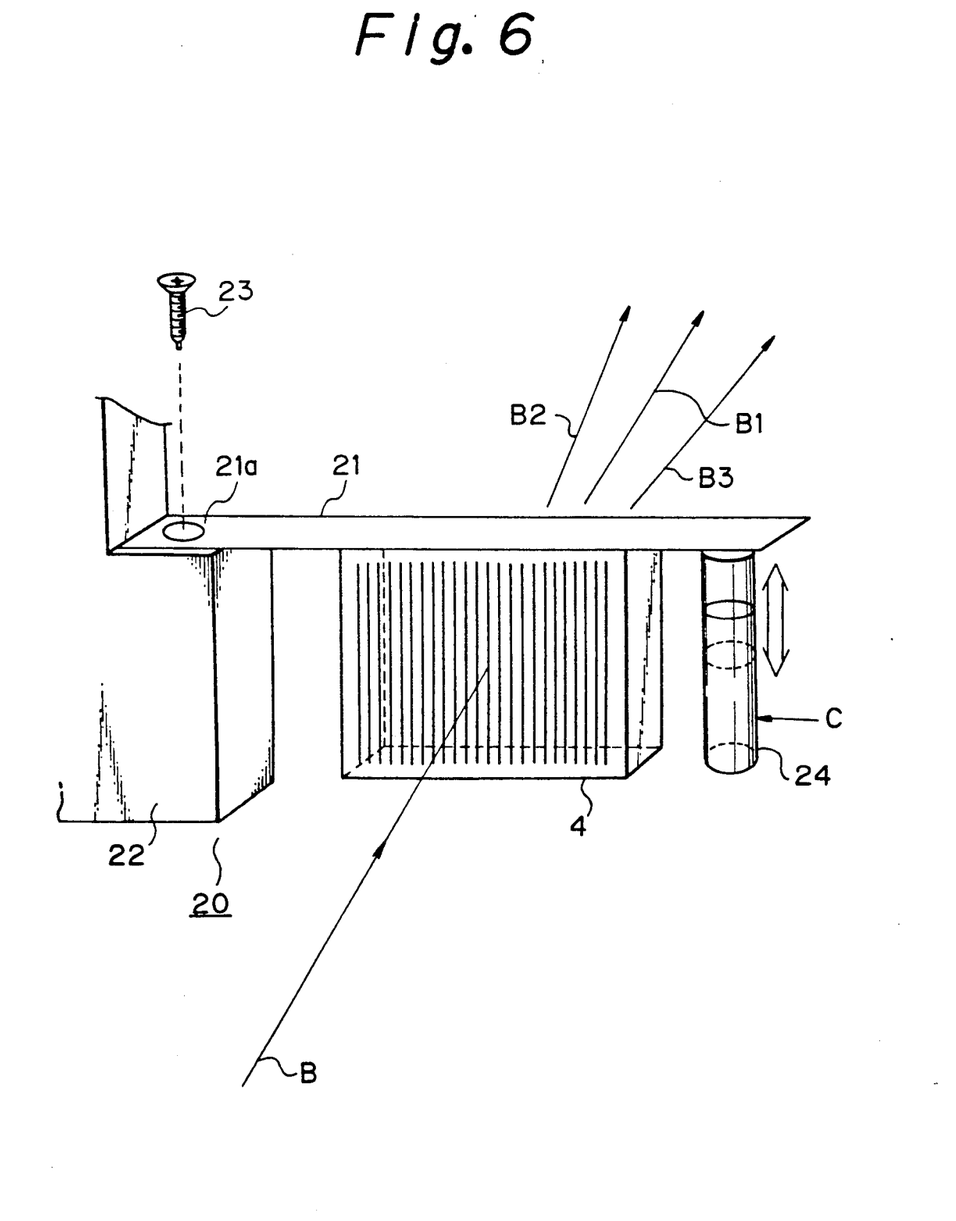
FIG. 6 is a perspective view showing another embodiment of the tilting mechanism shown in FIG. 4.

In FIG. 6, numeral 21 designates a leaf spring having the diffraction grid 4 fixed at the central portion thereof, numeral 22 a fixture part to supportingly fix one end of the leaf spring 21, numeral 23 a screw for securing the leaf spring to the fixture part 22 by way of a bore 21a provided at one end of the leaf spring 21, and numeral 24 a piezoelectric element adapted to support another end of the leaf spring 21 and flexible in the direction indicated by the arrow.

According to the constitution shown in FIG. 6, since the piezoelectric element 24 is allowed to expand in response to the switching signal C output from the signal switching circuit 13A and causing the diffraction grid 4 to tilt with the fixed end of the leaf spring 21 serving as a pivot, the respective beams B2 and B3 can change their orientation with the first beam B1 as the center. Accordingly, as described above, the irradiation locations of the respective light spots S2 and S3 relative to the information track T on the information recording medium 8 can be changed in a stepwise manner.

Figure 7:
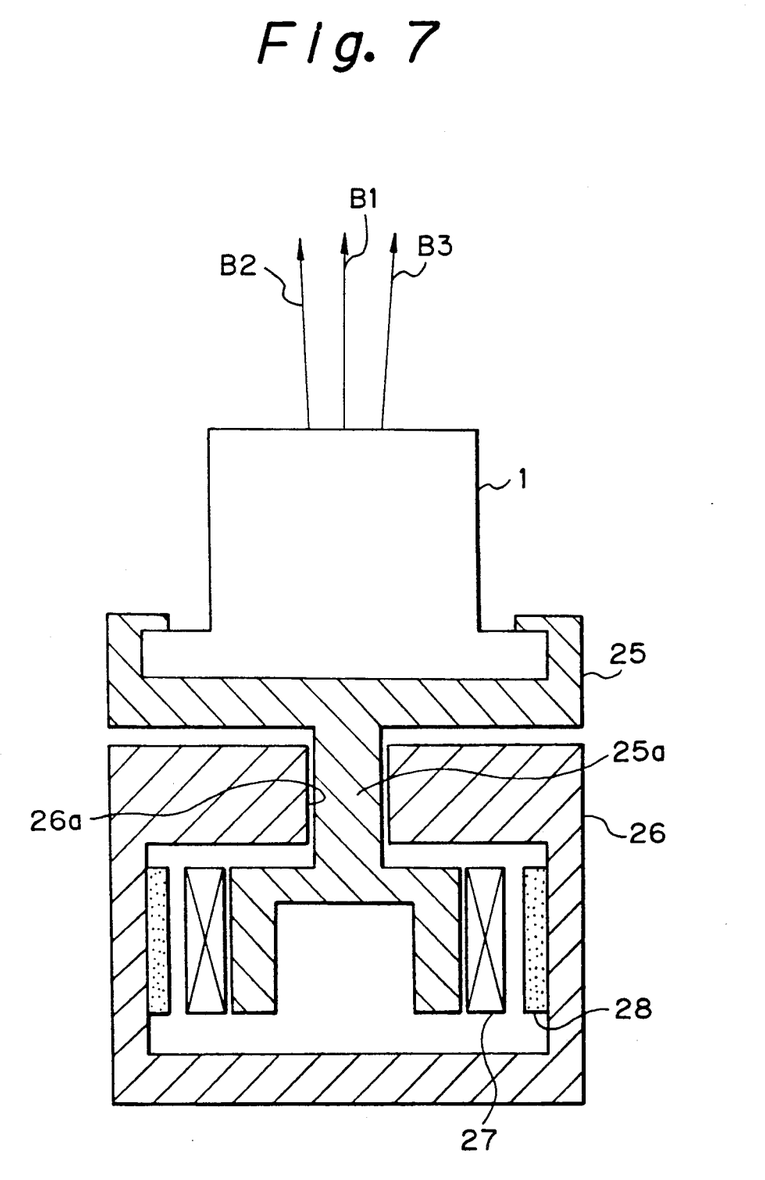
FIG. 7 is a side sectional elevation showing another embodiment of the light spot switching means according to the present invention.

In the above-described embodiment, although the tilting mechanism 20 for the diffraction grid 4 has been employed as a light spot switching means, a mechanism which will directly rotate the semiconductor laser source 1 as shown in FIG. 7 may be employed if the semiconductor laser source 1 is a three-beam semiconductor device capable of emitting three beams.

In FIG. 7, numeral 25 designates a rotary part adapted to supportingly fix the semiconductor laser source 1 and rotatable with a shaft portion 25a as the center, numeral 26 a fixture part having a bearing portion 26a for axially supporting the shaft portion 25a, numeral 27 a coil disposed along the outer periphery of the rotary part 25, and numeral 28 a magnet disposed along the inner circumference of the fixture part 26 oppositely to the coil 27, the coil 27 and the magnet 28 being constituted in the same manner as a conventional motor.

According to the constitution of FIG. 7, the rotary part 25 is rotated by a predetermined amount upon energization of the coil 27 in response to the switching signal C, and the respective beams B2 and B3 emitted from the semiconductor laser source 1 are caused to correspondingly rotate with the first beam B1 as the center, whereby the irradiation positions of the respective light spots S2 and S3 relative to the information track T on the information recording medium 8 can be switched in a stepwise manner.

What is claimed is:

1. An optical recording/reproducing apparatus capable of detecting tracking recording errors on an information recording medium comprising:

beam irradiation means for irradiating a first beam, by which information pits are recorded on/reproduced from the information track on said information recording medium, a second beam preceding said first beam and a third beam following said first beam, along said information track;

optical detector means having a plurality of light receiving surfaces for individually detecting the reflected light of said first beam, said second beam and said third beam, which have been reflected from said information recording medium;

means for, in a recording mode, monitoring the condition of said information track prior to and after recording in response to amount-of-light signals which respectively correspond to said reflected light of said second beam and said third beam; and means for, in a reproducing mode, producing a tracking error signal in response to said amount-of-light signals which respectively correspond to said reflected light of said second beam and said third beam, said optical recording/reproducing apparatus being characterized in that said beam irradiation means includes light spot switching means for changing the light spot locations of said second beam and said third beam so that the second and third beams are centered on the information track of the information recording medium when recording to enhance the reflected light of said second and third beams received by said optical detector means.

2. An optical recording/reproducing apparatus as set forth in claim 1, characterized in that said light spot switching means comprises a diffraction grid for forming said first beam, said second beam and said third beam, and a tilting mechanism for angularly rotating said diffraction grid to a tilted position so that the second and third beams are centered on the information track of the information recording medium.

3. An optical recording/reproducing apparatus as set forth in claim 1, characterized in that said beam irradiation means includes a semiconductor laser device for emitting three beams, and said light spot switching means is a mechanism for angularly rotating said semiconductor laser device to a tilted position so that the second and third beams are centered on the information track of said information recording medium.

4. An optical recording/reproducing apparatus capable of detecting tracking recording errors on an information recording medium comprising:

beam irradiation means for irradiating a first beam, by which information pits are recorded on/reproduced from the information track on said information recording medium, said beam irradiation means including a semiconductor laser device for emitting three beams including the first beam, a second beam preceding said first beam and a third beam following said first beam, along said information track;

optical detector means having a plurality of light receiving surfaces for individually detecting the reflected light of said first beam, said second beam and said third beam, which have been reflected from said information recording medium;

means for, in a recording mode, monitoring the condition of said information track prior to and after recording in response to amount-of-light signals which respectively correspond to said reflected light of said second beam and said third beam; and means for, in a reproducing mode, producing a tracking error signal in response to said amount-of-light signals which respectively correspond to said reflected light of said second beam and said third beam, said optical recording/reproducing apparatus being characterized in that said beam irradiation means includes light spot switching means, comprising a mechanism for angularly rotating said semiconductor laser, for changing the light spot locations of said second beam and said third beam on said information recording medium, depending upon said recording mode or said reproducing mode.

* * * * *